United States Patent [19]

Cooke

[11] 4,228,425
[45] Oct. 14, 1980

[54] TAMPER-PROOF TRANSPARENT SECURITY PLATE

[75] Inventor: William C. Cooke, Kingsport, Tenn.

[73] Assignee: AFG Industries, Inc., Kingsport, Tenn.

[21] Appl. No.: 875,283

[22] Filed: Feb. 6, 1978

[51] Int. Cl.² .................. G08B 13/04; G08B 13/12; E05G 1/10
[52] U.S. Cl. .................. 340/550; 340/541; 340/652; 200/61.08; 109/21; 52/782; 52/789
[58] Field of Search .............. 340/550, 541, 545, 566, 340/665, 652; 161/404; 109/21; 200/61.08; 52/616, 782, 788, 789, 791

[56] References Cited

U.S. PATENT DOCUMENTS

| | | | |
|---|---|---|---|
| 1,099,480 | 6/1914 | Winter | 340/550 |
| 1,223,583 | 4/1917 | Hitchcock | 340/550 |
| 3,696,373 | 10/1972 | Dunn et al. | 340/550 |
| 3,825,918 | 7/1974 | Laidlaw et al. | 340/550 |
| 3,825,920 | 7/1974 | Nelson et al. | 340/550 |
| 3,947,837 | 3/1976 | Bitterice | 340/550 |

Primary Examiner—Sr. Caldwell
Assistant Examiner—Donnie L. Crosland
Attorney, Agent, or Firm—Pennie & Edmonds

[57] ABSTRACT

A tamper-proof transparent security plate has a laminated structure of a break-resistant, normally transparent plate member which becomes opaque upon forceful penetration and a transparent alarm plate containing a plurality of frangible electrically conductive wires extending across an area to be protected. Efforts to break the laminated structure render it opaque, making it extremely difficult to locate and tamper with the wires of the alarm plate. Moreover, a selected subset of the wires can be excluded from a series alarm grid to further thwart efforts to bypass an associated alarm circuit. In a preferred embodiment, the voltage applied to the wires is adjustable to provide an optional heating, de-icing, or defogging capability.

3 Claims, 5 Drawing Figures

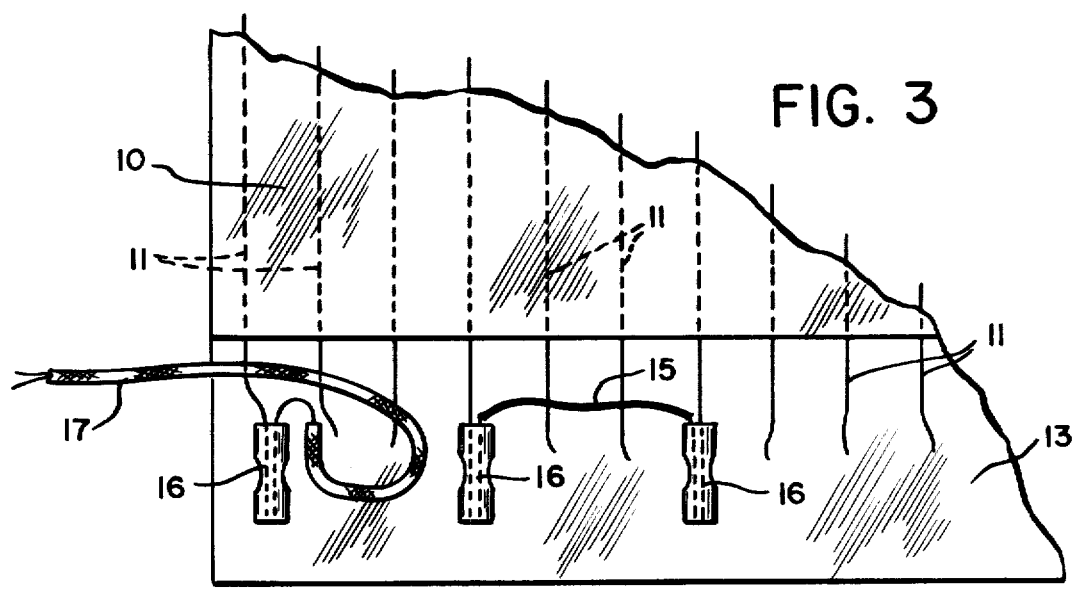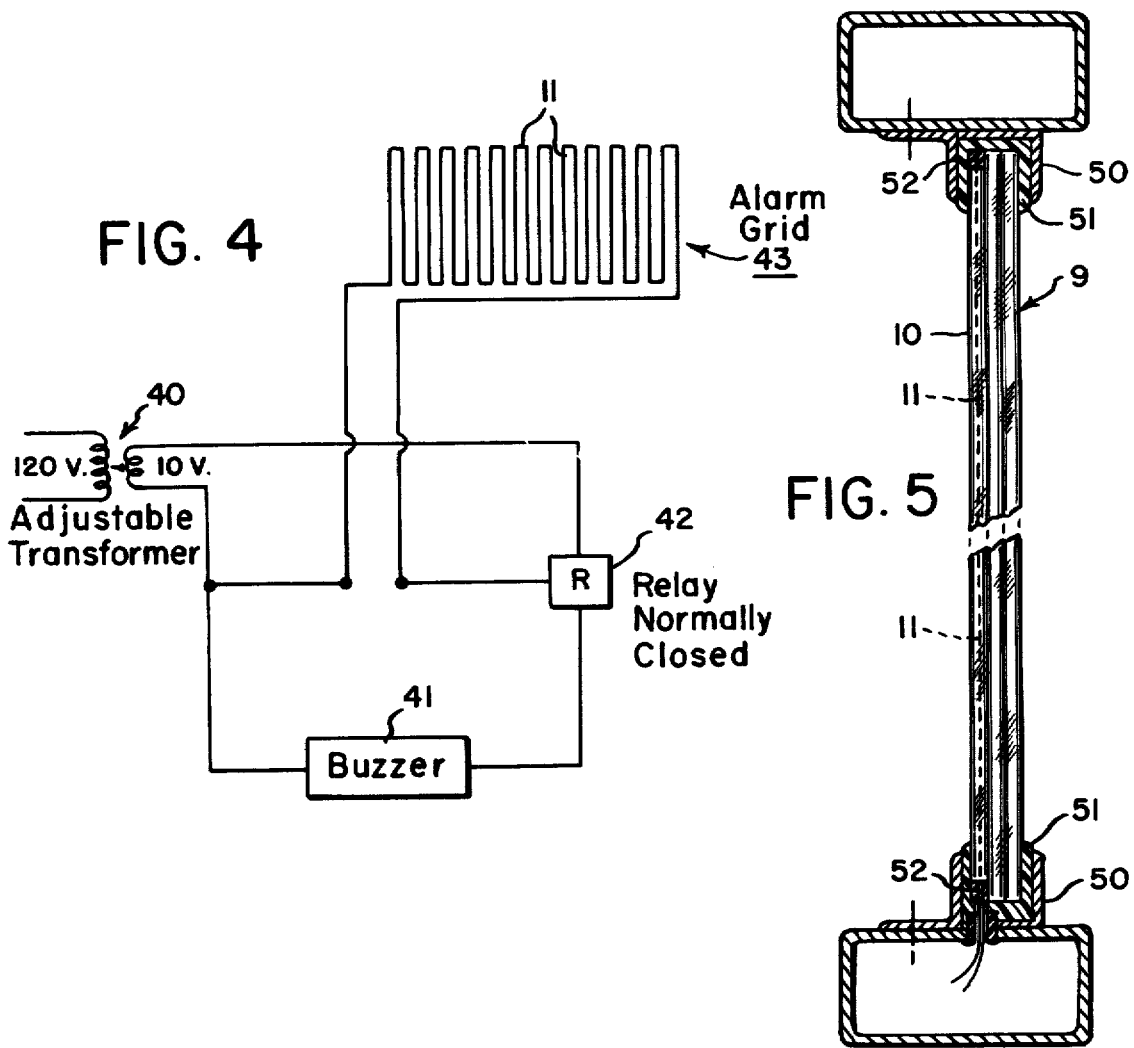

4,228,425

TAMPER-PROOF TRANSPARENT SECURITY PLATE

BACKGROUND OF THE INVENTION

This invention relates to a transparent security plate and, in particular, to a transparent security plate having enhanced resistance to electrical tampering.

Transparent security plates have a wide variety of applications. They provide protection while permitting visual display of jewels and valuable artifacts in shops and museums, and they provide barless windows in detention centers, and unobstructed viewing portals in high-security prisons.

While a number of security plate constructions are in current use, none are completely protected against tampering. Typical security plate constructions comprise an alarm grid of series or parallel connected frangible conducting wires laminated between a pair of break-resistant glass plates. The wires are electrically coupled to an alarm system and, theoretically, at least breakage of the plate results in breakage of wires and a consequent alarm. Upon occasion, however, such alarm systems have been bypassed by penetrating one of the plates and shunting the wires around areas for further penetration.

Accordingly, there is a need for a transparent security plate having enhanced resistance to electrical tampering.

SUMMARY OF THE INVENTION

In accordance with the present invention, a tamper-proof transparent security plate comprises a laminated structure of a break-resistant normally transparent plate member which becomes opaque upon forceful penetration and a transparent alarm plate containing a plurality of frangible electrically conductive wires extending across an area to be protected. Efforts to break the laminated structure render it opaque, making it extremely difficult to locate and tamper with the wires of the alarm plate. Moreover, a selected subset of the wires can be excluded from a series alarm grid to further thwart efforts to bypass an associated alarm circuit. In a preferred embodiment, the voltage applied to the wires is adjustable to provide an optional heating, de-icing, or defogging capability.

BRIEF DESCRIPTION OF THE DRAWINGS

The nature, advantages, and various additional features of the invention will appear more fully upon consideration of the illustrative embodiments now to be described in detail in connection with the accompanying drawings.

In the drawings:

FIG. 3 is an enlarged portion of the front view, showing details of wire interconnection.

FIG. 4 is a schematic circuit diagram of an alarm circuit useful with the security plate of FIGS. 1-3; and FIG. 5 is a cross-sectional view of a preferred arrangement for mounting the security plate of FIGS. 1-3.

For convenience of reference, the same structural elements are designated by the same reference numerals throughout the drawings.

DETAILED DESCRIPTION

Figure 1:
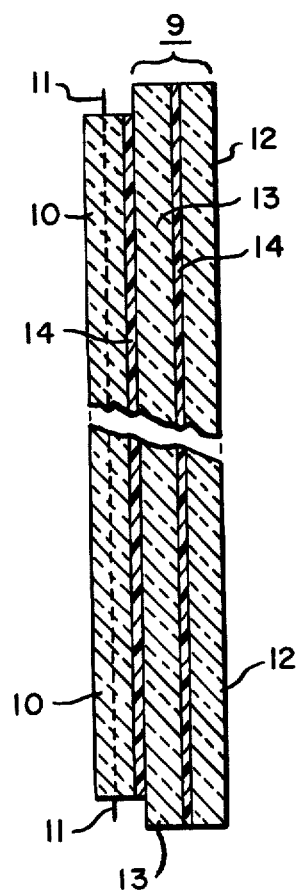
FIG. 1 is a cross-sectional view of a preferred embodiment of a transparent security plate in accordance with the invention.

Referring to the drawings, FIG. 1 is a cross-sectional view of a security plate in accordance with the invention comprising a laminated structure of a break-resistant, normally transparent compound plate member 9 which becomes opaque upon forceful penetration and, laminated thereto, a transparent alarm plate 10 containing a plurality of frangible, electrically conductive elements 11, such as wires or ribbons, extending across an area to be protected. Preferably break resistant member 9 extends beyond alarm plate 10 in the dimension parallel to elements 11 in order to further the wire interconnections.

In a preferred embodiment, plate member 9 comprises a pair of annealed glass plates 12 and 13, such as $\frac{1}{4}$" sheets of Float glass, laminated by a thin layer 14 of plastic, such as 0.060" layer of polyvinyl butyral. Upon attempts at forceful penetration, this structure becomes opaque before penetration extends through member 9 to alarm plate 10.

Alarm plate 10 can be a $\frac{1}{4}$" sheet of polished Pinstripe wired glass containing plural parallel strands of 24-gauge steel wire embedded within the glass with center-to-center spacings of about $\frac{1}{2}$". As shown more clearly in the front view of FIG. 2, a subject of these wires, e.g., every fourth, eighth, ninth, or tenth wire can be interconnected by insulated wire strands 15 at the edges to define a detecting grid for an electrical alarm system. The interconnection, a subset of less than all of the wires, greatly increases the difficulty of bypassing the alarm system as a potential tamperer will not easily perceive which among the wires require bypassing or the interconnection sequence for bypassing the alarm.

FIG. 3 is an enlarged view of a corner portion of a front view, illustrating the details of wire interconnection. The steel Pinstripe wires 11 are connected to strands of 22 AWG hookup wire 15 by Krimptite Wire connectors 16. The wires 11 can be connected in series, in parallel or in series-parallel. Output from the alarm grid is received by 16 AWG multi-strand insulated lead wire 17 and coupled to an appropriate alarm circuit.

Float glass and Pinstripe glass are products marketed by ASG Industries, Inc., Kingsport, Tenn. Polyvinyl butyral is available from E. I. duPont, Wilmington, Del. Krimptite connectors are marketed by Walden Electronics, Chicago, Ill.

FIG. 4 is a schematic circuit diagram of a preferred alarm circuit comprising simply an adjustable voltage electrical power source, such as adjustable transformer 40 coupled to a remote alarm indicator, such as buzzer 41 through a normally closed relay 42 controlled by serially interconnected alarm grid 43. Here breakage of any strand 11 of the alarm grid opens the relay and thereby triggers an alarm.

The electrical power source is preferably of the adjustable voltage type in order to provide the security plate with an optional heating, de-icing, or de-fogging capability. As the applied voltage V increases, resistance heating of the steel wires in the Pinstripe glass increases in proportion to $V^2/R$, where R is the total wire resistance, from minimal values below about 0.01 watt per square inch to moderate values below about 0.15 watts per square inch useful in defogging and de-icing and thence to higher values in excess of 0.15 watts per square inch useful in space heating. The electrical heating characteristics for various levels of voltage applied to a typical pate are given in Table 1 below:

TABLE 1

(Electrical Heating Characteristics for 34" × 76" Panel Of Pinstripe Glass With Electrical Resistance Of 8.5 Ohms)

| Input Voltage | Amperes | Wattage | Watts/Sq. In. |
|---|---|---|---|
| 5 | 1 | 5 | 0.0019 |
| 10 | 1.2 | 12 | 0.0046 |
| 12 | 1.3 | 15.6 | 0.006 |
| 15 | 1.8 | 27 | 0.010 |
| 24 | 2.8 | 67.2 | 0.026 |
| 40 | 4.6 | 184.0 | 0.071 |
| 50 | 5.5 | 274.0 | 0.106 |
| 70 | 7.4 | 518.0 | 0.200 |
| 80 | 8.2 | 656.0 | 0.254 |

Figure 2:
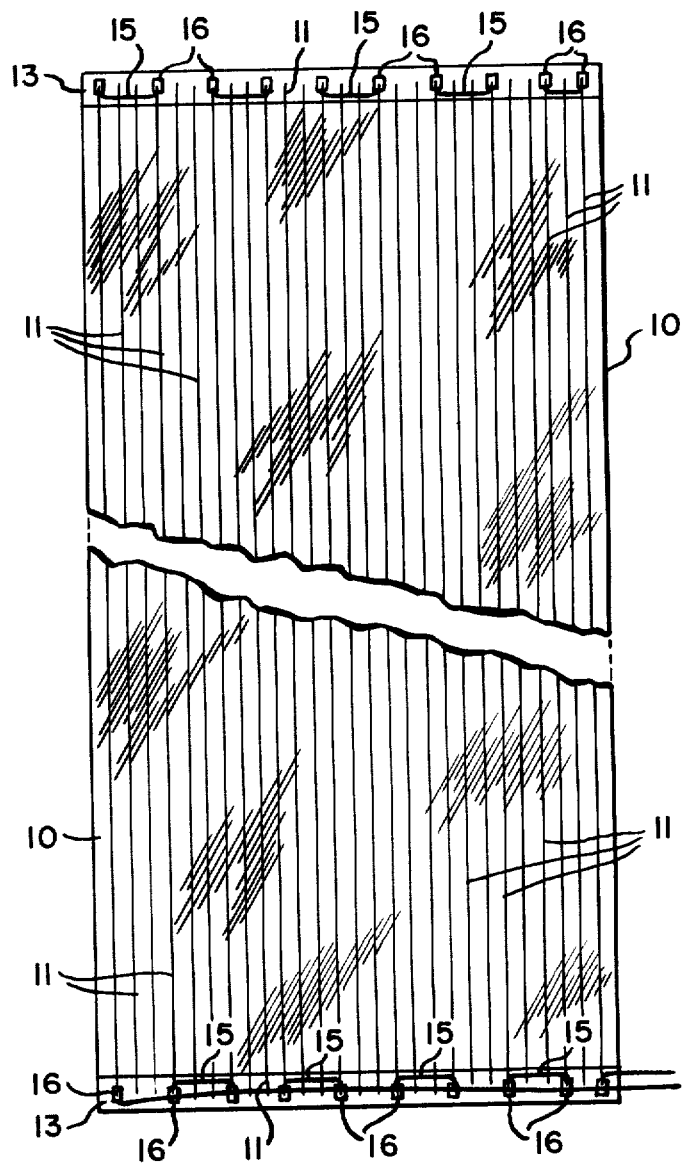
FIG. 2 is a front view of the embodiment of FIG. 1.

FIG. 5 is a cross section of a preferred arrangement for mounting the security plate of FIGS. 1-3. As can be seen, with the surface of plate member 9 subject to attack on the right side, the wire interconnections to plate 10 are not visible and are not readily attacked without penetration of plate member 9. They are hidden from view and additionally protected by an angle stop 50, glazing gasket 51, and a covering of silicone sealant 52, such as G. E. 1200 series Silicone.

While the invention has been described in connection with a small number of specific embodiments, it will be understood that these are merely illustrative of the many other specific embodiments which can also utilize the principles of the invention. Thus, numerous and varied devices can be made by those skilled in the art without departing from the spirit and scope of the present invention.

I claim:
1. A tamper-proof transparent security plate comprising:
a break-resistant, normally transparent plate structure which becomes opaque upon forceful penetration, said plate structure comprising a pair of break-resistant glass plates laminated to one another by a thin layer of polyvinyl-butyral plastic which becomes opaque upon breakage;
a transparent alarm plate containing a plurality of frangible electrically connected conductive wires extending across an area to be protected, said alarm plate is laminated to said plate structure and comprises a single sheet of glass containing said wires embedded within said sheet; and
a variable voltage source connected to said wires for varying the current passing through said wires to provide said security plate with an optional heating, de-icing, or defogging capability.

2. A transparent security plate according to claim 1 wherein said sheet of glass contains a plurality of parallel strands of wire with only a selected subset of said wires being electrically interconnected for forming a detecting grid for an electrical alarm system.

3. A transparent security plate acording to claim 1 wherein:
a plurality of frangible electrically conductive elements in said transparent alarm plate are electrically interconnected at one or more edges of said alarm plate; and
said break-resistant plate structure extends beyond said alarm plate in order to protect the interconnections between said conductive elements.

* * * * *